US012463676B2

(12) United States Patent
Pedersen

(10) Patent No.: US 12,463,676 B2
(45) Date of Patent: Nov. 4, 2025

(54) COMMUNICATION APPARATUS FOR MISSION PERFORMING USER AND RELATED METHODS

(71) Applicant: Falcom A/S, Ballerup (DK)

(72) Inventor: Søren Christian V. Pedersen, Valby (DK)

(73) Assignee: Falcom A/S, Ballerup (DK)

( * ) Notice: Subject to any disclaimer, the term of this patent is extended or adjusted under 35 U.S.C. 154(b) by 431 days.

(21) Appl. No.: 17/844,469

(22) Filed: Jun. 20, 2022

(65) Prior Publication Data

US 2022/0321157 A1 Oct. 6, 2022

Related U.S. Application Data

(63) Continuation of application No. PCT/EP2020/087147, filed on Dec. 18, 2020.

(30) Foreign Application Priority Data

Dec. 20, 2019 (EP) ..................................... 19218942

(51) Int. Cl.
*H04B 1/00* (2006.01)
*A61F 11/14* (2006.01)
(Continued)

(52) U.S. Cl.
CPC ............ *H04B 1/385* (2013.01); *A61F 11/145* (2022.01); *H04R 1/1041* (2013.01);
(Continued)

(58) Field of Classification Search
CPC ............ H04B 1/385; H04B 2001/3866; A61F 11/145; A61F 11/06; H04R 1/1041;
(Continued)

(56) References Cited

U.S. PATENT DOCUMENTS 11,694,771 B2 * 7/2023 Boesen ................. G16H 10/20
705/3
2005/0117771 A1 6/2005 Vosburgh et al.
(Continued)

FOREIGN PATENT DOCUMENTS

CN 111076768 A * 4/2020 ............. G01D 21/02
EP 2866464 4/2015
(Continued)

OTHER PUBLICATIONS

PCT International Search Report and Written Opinion for International Appln. No. PCT/EP2020/087130 dated Mar. 16, 2021.
(Continued)

*Primary Examiner* — Ping Y Hsieh
(74) *Attorney, Agent, or Firm* — Vista IP Law Group, LLP

(57) ABSTRACT

A communication apparatus, a communication system, a related method, and a server device is disclosed. The communication apparatus comprises a communication device, a sensor interface device comprising a sensor interface configured to connect with a plurality of sensor devices including a first sensor device and a second sensor device, a memory, and a processing unit. The processing unit is configured to: obtain first sensor data via a first sensor interface of the sensor interface; obtain second sensor data via a second sensor interface of the sensor interface; and determine user data based on the first sensor data and the second sensor data.

31 Claims, 5 Drawing Sheets

(51) Int. Cl.
*H04B 1/3827* (2015.01)
*H04R 1/10* (2006.01)

(52) U.S. Cl.
CPC ... *H04R 1/1083* (2013.01); *H04B 2001/3866* (2013.01); *H04R 2420/07* (2013.01)

(58) Field of Classification Search
CPC .... H04R 1/1083; H04R 2420/07; A42B 3/16; H04W 4/80
See application file for complete search history.

(56) References Cited

U.S. PATENT DOCUMENTS

| | | | |
|---|---|---|---|
| 2012/0212399 | A1 | 8/2012 | Border et al. |
| 2016/0076858 | A1 | 3/2016 | Howes |
| 2016/0125885 | A1 | 5/2016 | Betts et al. |
| 2017/0248272 | A1 | 8/2017 | Ullrich et al. |
| 2017/0372216 | A1 | 12/2017 | Awiszus et al. |
| 2017/0374455 | A1 | 12/2017 | Shastry et al. |
| 2018/0139566 | A1 | 5/2018 | Crum |
| 2019/0230431 | A1 | 7/2019 | Raft |
| 2019/0318719 | A1 | 10/2019 | Copt et al. |
| 2020/0129077 | A1* | 4/2020 | Rogers ............ A61B 5/0816 |
| 2021/0137382 | A1* | 5/2021 | Koster ............ A61B 5/6805 |
| 2021/0248505 | A1 | 8/2021 | Awiszus |
| 2021/0377704 | A1* | 12/2021 | Tian ............ H04W 4/80 |

FOREIGN PATENT DOCUMENTS

| | | | | |
|---|---|---|---|---|
| JP | 2017533794 | | 11/2017 | |
| JP | 2018-502998 | | 2/2018 | |
| KR | 10-2019-0022685 | | 3/2019 | |
| WO | WO 2016/060708 | | 4/2016 | |
| WO | WO 2017/223469 | | 12/2017 | |
| WO | WO-2017223469 | A1 * | 12/2017 | ............ A41D 13/12 |

OTHER PUBLICATIONS

PCT International Search Report and Written Opinion for International Appln. No. PCT/EP2020/087136 dated Mar. 10, 2021.
PCT International Search Report and Written Opinion for International Appln. No. PCT/EP2020/087147 dated Jan. 21, 2021.
Foreign OA for JP Patent Appln. No. 2022-537677 dated Aug. 19, 2024 (with English translation).
Non-Final Office Action for U.S. Appl. No. 17/843,960 dated Mar. 18, 2025.
English Translation of Korean OA dated Mar. 25, 2025 for Korean patent application No. 10-2022-7023587.
Non-Final Office Action for U.S. Appl. No. 17/843,958 dated Dec. 18, 2023.
Notice of Allowance for U.S. Appl. No. 17/843,958 dated May 8, 2024.
Non-Final Office Action for U.S. Appl. No. 17/843,960 dated Apr. 16, 2024.
Final Office Action for U.S. Appl. No. 17/843,960 dated Aug. 21, 2024.
Final Office Action for U.S. Appl. No. 17/843,960 dated Jul. 17, 2025.
Foreign Exam Report for AU Appln. No. 2020406213 dated Jun. 19, 2025.

* cited by examiner

COMMUNICATION APPARATUS FOR MISSION PERFORMING USER AND RELATED METHODS

RELATED APPLICATION DATA

This application is a continuation of International Patent Application No. PCT/EP2020/087147 filed on Dec. 18, 2020, which claims priority to and the benefit of European Patent Application No. 19218942.1 filed on Dec. 20, 2019. The entire disclosures of the above applications are expressly incorporated by reference herein.

FIELD

The present disclosure relates to a hearing protection apparatus and devices thereof including a communication device for a hearing protection apparatus and related methods including a method of operating a hearing protection apparatus.

BACKGROUND

In combat situations or other stressed environments with extreme environmental conditions such as war zones or battlefields, it is desirable for a user to effectively protect his/her condition, such as physical condition, mental condition, and equipment condition while enabling the user to communicate with teammates via radio or other communication systems. During combat situations or other stressed environments, a user may need to wear equipment such as a hearing protection device to attenuate noise, e.g. from gunfire, machinery and other types of constant or intermittent noise or other equipment helping the user in stressed environments.

A drawback of wearing a plurality of equipment in extreme environmental conditions, is that the user is subjected to discomfort related to the weight of the equipment, the size of the equipment, and the restrictive movement and space that the user has when wearing the equipment. A further drawback of having increasing amount of equipment, is that the size and complexity of the communication equipment, such as the size of communication apparatuses and communication devices are increasing.

SUMMARY

Accordingly, there is a need for communication apparatuses for hearing protection apparatuses, communication systems, and methods which increases the condition awareness of a user during combat situations or other stressed environments.

A communication apparatus for a hearing protection apparatus for a mission performing user is disclosed. The communication apparatus comprises a communication device, a memory, a processing unit, and a sensor interface device comprising a sensor interface configured to connect with a plurality of sensor devices including a first sensor device and a second sensor device. The processing unit is configured to obtain first sensor data via a first sensor interface of the sensor interface. The processing unit is configured to obtain second sensor data via a second sensor interface of the sensor interface.

The processing unit is configured to determine user data based on the first sensor data and the second sensor data.

Further, a communication system for a hearing protection apparatus for a mission performing user is disclosed. The communication system comprises a communication apparatus comprising a communication device comprising a memory, a processing unit, a radio unit interface, and a sensor interface device. The communication system comprises a plurality of sensor devices including a first sensor device and a second sensor device, and a radio unit. The sensor interface device comprises a sensor interface configured to connect with the plurality of sensor devices. The processing unit is configured to obtain first sensor data via a first sensor interface of the sensor interface. The processing unit is configured to obtain second sensor data via a second sensor interface of the sensor interface. The processing unit is configured to determine user data based on the first sensor data and the second sensor data. The processing unit is optionally configured to transmit the user data via the radio unit to a server device.

Further, a method of operating a communication apparatus for a hearing protection apparatus for a mission performing user is disclosed. The communication apparatus comprises a communication device and a sensor interface device. The sensor interface device comprises a sensor interface configured to connect with a plurality of sensor devices including a first sensor device and a second sensor device. The communication apparatus comprises a memory and a processing unit. The method comprises obtaining first sensor data via a first sensor interface of the sensor interface. The method comprises obtaining second sensor data via a second sensor interface of the sensor interface. The method comprises determining user data based on the first sensor data and the second sensor data.

Also disclosed is a server device for sensor data monitoring in a communication system comprising a communication apparatus, a radio unit and the server device. The communication apparatus comprises a communication device and a sensor interface device. The server device comprises one or more processors, a memory, and an interface. The server device is configured to obtain user data from the communication apparatus. The server device is configured to determine event data based on the user data. The server device is configured to determine a transmission scheme for the event data. The server device is configured to transmit the event data according to the transmission scheme.

It is an advantage of the present disclosure that the condition awareness of a user of the communication apparatus is enhanced in real-time, which in turn reduces decision time.

It is also an advantage of the present disclosure that the size of the communication equipment, such as the size of the communication apparatuses and communication devices may be reduced, while being able to communicate with a plurality of sensor devices. The size of the communication apparatus may be reduced by having a separate communication device and sensor interface device, where the sensor interface device may be dedicated to the connection of the sensor devices. A further advantage of having a separate communication device and sensor interface device, is that the complexity of the communication apparatus and the communication device may be reduced. Further the communication device already having a connection interface for communication with the hearing protection device and the radio unit, it may be avoided to have a further interface for sensor devices, thereby decreasing the complexity of the communication device.

A further advantage is that the communication apparatus may be allowed to collect a plurality of sensor data from a plurality of sensor devices.

A further advantage is that event data, such as discomfort of the user, health critical conditions of the user, battery status of the equipment, armor/ammunition status of a weapon of the user, the condition of a water hose of a firefighter, and/or overheating of the equipment, may be determined or detected.

It is also an advantage that the user data such as the condition of the user, such as the weight load of the user, the temperature of the user, and/or the physical activity of the user, may be monitored based on the sensor data (e.g. the distance travelled by the user).

A further advantage may be that the addition and/or removal of sensor devices may be less complicated by having a sensor interface device which is configured to connect to a plurality of sensor devices, and dedicated to the connection of sensor devices.

Further, the present disclosure may allow to inform the user about his/her condition and/or the condition of the equipment e.g. through audio outputs via the hearing protection device.

BRIEF DESCRIPTION OF THE DRAWINGS

The above and other features and advantages will become readily apparent to those skilled in the art by the following detailed description of exemplary communication devices, methods, and/or server devices thereof with reference to the attached drawings, in which.

DETAILED DESCRIPTION

Figure 1:
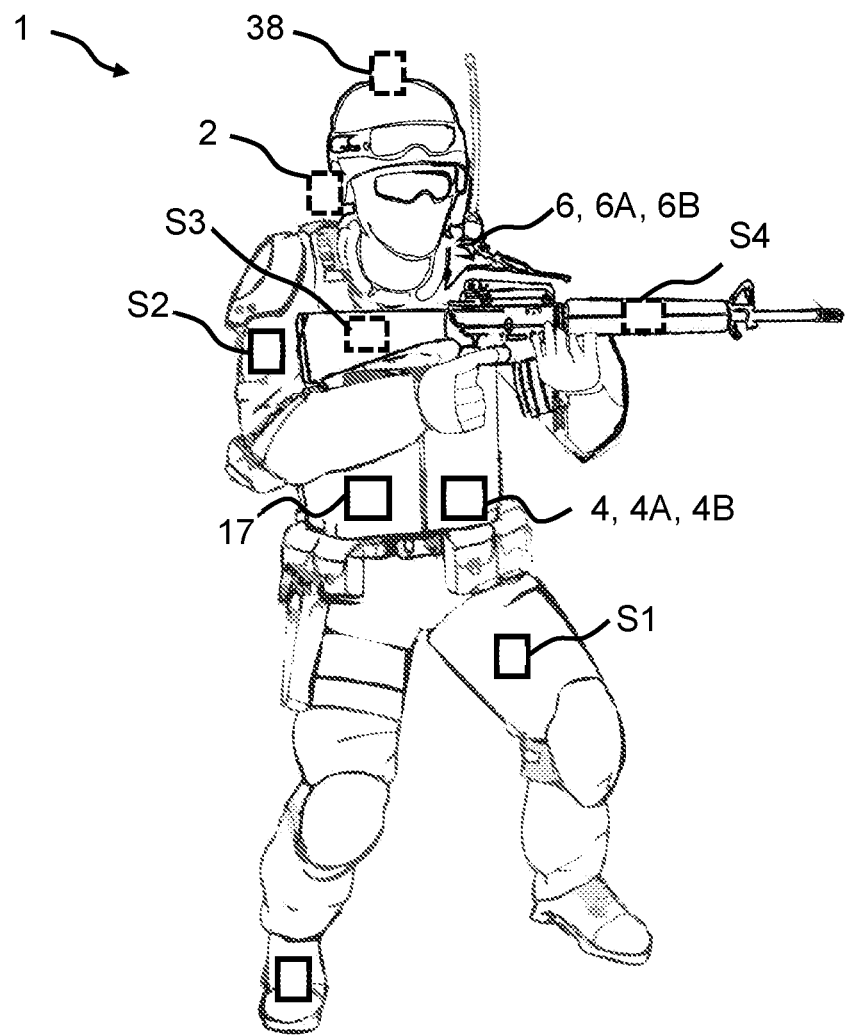
FIG. 1 schematically illustrates a mission performing user wearing an exemplary hearing protection system comprising a communication apparatus according to the disclosure.

Various exemplary communication devices, methods, and/or server devices and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the communication devices, methods, and/or server devices. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other communication devices, methods, and/or server devices even if not so illustrated, or if not so explicitly described.

A communication apparatus for a hearing protection apparatus for a mission performing user is disclosed. The mission performing user may comprise a user which is exposed to extreme environments or extreme physical or mental stress, such as military persons, police persons, and/or firefighters.

The communication apparatus comprises a communication device, a memory, a processing unit, and a sensor interface device comprising a sensor interface configured to connect with a plurality of sensor devices including a first sensor device and a second sensor device.

The sensor interface device may comprise one or more sensor interfaces configured to connect with a plurality of sensor devices. The sensor interface device may comprise one or more wired and/or wireless interfaces configured to connect with the plurality of sensor devices. The sensor interface device may be configured to communicate with the communication device through a wired or wireless connection e.g. via an interface. The sensor interface device and the communication device may comprise one or more interfaces configured to provide a connection between the sensor interface device and the communication device. In other words, the sensor interface device may be understood as a sensor hub. The communication device may be releasably connected to the sensor interface device via respective connectors of communication device and sensor interface device for mechanical and electrical connection between communication device and the sensor interface device.

The communication device may further comprise one or more radio unit interfaces and/or one or more hearing protection device interfaces.

The one or more radio unit interfaces may allow the connection of the communication device to one or more radio units of a hearing protection system of the user, and the one or more hearing protection device interfaces may allow the connection of the communication device to one or more hearing protection devices.

In one or more exemplary communication apparatuses, communication systems, methods, and/or server devices, the communication apparatus comprises a radio unit interface, and the processing unit is configured to transmit the user data via the radio unit interface to a radio unit of the hearing protection apparatus.

The hearing protection device interface and the radio unit interface may comprise wireless or wired interfaces.

The processing unit is configured to obtain first sensor data via a first sensor interface of the sensor interface. The processing unit may be configured to store the obtained first sensor data on the memory. The processing unit may be configured to obtain first sensor data via the first sensor interface of the sensor interface from the first sensor device measuring a first parameter and generating the first sensor data based on the first parameter.

The first sensor data may comprise data related to the user of the communication apparatus and/or data related to the equipment worn by the user.

The first sensor data may comprise information related to a physical condition and/or mental condition of the user. The first sensor data may comprise a first body temperature of the user e.g. measured by a first sensor device such as a first temperature sensor at a first body position e.g. as the head of the user or the torso of the user, thereby providing information related to the physical condition of the user. The first sensor data may comprise data from an eye tracker (e.g. for control of end-user devices) such as eye position or eye direction data. The first sensor data may comprise data from a radio of the user e.g. when the user operates a push-to-talk button of the radio to transmit from the radio (e.g. to other users of the group on the same network). The first sensor data may comprise one or more of a pulse, a blood pressure, an electrocardiogram, ECG, an oxygen level, and/or a level of hydration of the user. The first sensor data may further comprise data related to a brain activity, a neural activity, and/or a fatigue or tiredness level of the user. The first sensor data may further comprise acceleration data from an accelerometer (e.g. to determine physical activity of the user and/or if a user has fallen) and/or light data from a light sensor (e.g. to determine the light conditions of the environment of the user). The first sensor device may provide information to the user wearing the first sensor device but may optionally also provide information to a group or squad of users, e.g. at higher level such as a server device which may provide data for more advanced algorithms and simulations.

The first sensor data may comprise information related to the condition of the equipment of the user. The first sensor data may thereby comprise data related to the equipment of the user, such as one or more of weight of the equipment, an armor status of a weapon of the user, vibrations or stress of the weapon/other equipment and/or a temperature of the equipment of the user.

The first sensor device and/or the second sensor device may be wired sensor devices and/or wireless sensor devices.

The processing unit is optionally configured to obtain second sensor data via a second sensor interface of the sensor interface.

The processing unit may be configured to store the obtained second sensor data on the memory. The processing unit may be configured to obtain second sensor data via the second sensor interface of the sensor interface from the second sensor device measuring a second parameter and generating the second sensor data based on the second parameter.

The second sensor data may comprise data related to the user of the communication apparatus and/or data related to the equipment worn by the user.

The second sensor data may comprise information related to a physical condition and/or mental condition of the user. The second sensor data may comprise a second body temperature of the user e.g. measured by a second sensor device such as a second temperature sensor at a second body position e.g. as the head of the user or the torso of the user, thereby providing information related to the physical condition of the user. The second sensor data may comprise one or more of a pulse, a blood pressure, an electrocardiogram, ECG, an oxygen level, and/or a level of hydration of the user. The second sensor data may further comprise data related to a brain activity, a neural activity, e.g. to determine a level of fatigue or tiredness level of the user.

The second sensor data may comprise information related to the condition of the equipment of the user. The second sensor data may thereby comprise data related to the equipment of the user, such as one or more of the weight of the equipment, the armor status of the weapon of the user and/or the temperature of the equipment of the user.

The processing unit is configured to determine user data based on the first sensor data.

Optionally, the processing unit is configured to determine user data based on the first sensor data and the second sensor data.

The user data may comprise, be indicative of, or corresponding to a condition of the user and/or a condition of the equipment of the user. The user data may comprise data related to a physical and/or a mental state of the user, such as body temperature of the user, a level of fatigue and/or a condition of the equipment of the user such as a temperature of the hearing protection system, a temperature of the weapon or other equipment, vibrations or stress of the weapon or other equipment, and/or a level of ammunition of the weapon.

In one or more exemplary communication apparatuses, communication systems, methods, and/or server devices, the first sensor interface comprises a first connector for mechanical and electrical connection to the first sensor device.

In one or more exemplary communication apparatuses, communication systems, methods, and/or server devices, the second sensor interface comprises a second connector for mechanical and electrical connection to the second sensor device.

The sensor interface device may comprise a connector for each of a plurality of sensor devices.

In one or more exemplary communication apparatuses, communication systems, methods, and/or server devices, the user data comprises a first user parameter indicative of a physical state of the user.

The first user parameter may be indicative of the first sensor data, e.g. indicative of a first temperature and/or a first heart rate of the user. The first user parameter may indicate a health condition or state of the user, such as tired, exhausted, ready, and/or dehydrated.

In one or more exemplary communication apparatuses, communication systems, methods, and/or server devices, the first sensor data is indicative of a first temperature measured by the first sensor device positioned on a first part of the body of the user.

The first sensor device may for example be a body-worn sensor or a head-worn sensor. The first sensor device may be a torso-worn sensor.

In one or more exemplary communication apparatuses, communication systems, methods, and/or server devices, the second sensor data is indicative of a second temperature measured by the second sensor being positioned at a second part of the body of the user.

The second sensor device may for example be a body-worn sensor or a torso-worn sensor. The second sensor device may be a head-worn sensor By measuring the temperature of the user at different parts of the body of the user, it may be possible to compare the temperature measurements in order to assess whether a temperature measurement is abnormal compared to a reference measurement, such as to assess if a part of the body of the user is exposed to dangerously temperature extremums (e.g. very hot or very cold temperatures).

In one or more exemplary communication apparatuses, communication systems, methods, and/or server devices, the first sensor data is indicative of first chemical data measured by the first sensor device being a first chemical sensor. In other words, the chemical sensor may comprise a nuclear, biological, and/or other chemical sensors. at squad level can both detect and give warning for individual soldier. Thus, the first sensor device may be a chemical sensor e.g. to measure physiological and/or biochemical data of the user.

In one or more exemplary communication apparatuses, communication systems, methods, and/or server devices, the sensor interface device comprises a wireless interface and a wired interface.

The sensor interface device may for example connect to the first sensor device via the wireless interface and to the second sensor device via the wired interface. In other words, the first sensor interface may comprise a wireless interface and the second sensor interface may comprise a wired interface. The first sensor device may thereby be a wireless sensor device and the second sensor device may be a wired sensor device.

In one or more exemplary communication apparatuses, communication systems, methods, and/or server devices, the processing unit is comprised in the communication device. Alternatively, the processing unit may be comprised in the sensor interface device.

A communication system for a hearing protection apparatus for a mission performing user is disclosed. The communication system comprises a communication apparatus comprising a communication device comprising a memory, a processing unit, a radio unit interface, and a sensor interface device. The communication system comprises a plurality of sensor devices including a first sensor device and a second sensor device, and a radio unit. The sensor interface device comprises a sensor interface configured to connect with the plurality of sensor devices. The processing unit is configured to obtain first sensor data via a first sensor interface of the sensor interface.

Optionally, the processing unit is configured to obtain second sensor data via a second sensor interface of the sensor interface.

The processing unit is configured to determine user data based on the first sensor data.

Optionally, the processing unit is configured to determine user data based on the first sensor data and the second sensor data. The processing unit is optionally configured to transmit the user data via the radio unit to a server device.

A method of operating a communication apparatus for a hearing protection apparatus for a mission performing user is disclosed. The communication apparatus comprises a communication device and a sensor interface device. The sensor interface device comprises a sensor interface configured to connect with a plurality of sensor devices including a first sensor device and a second sensor device. The communication apparatus comprises a memory and a processing unit. The method comprises obtaining first sensor data via a first sensor interface of the sensor interface. The method comprises obtaining second sensor data via a second sensor interface of the sensor interface. The method comprises determining user data based on the first sensor data and the second sensor data.

In one or more exemplary communication apparatuses, communication systems, methods, and/or server devices, the method comprises positioning the sensor interface device on a torso of the user.

The torso of the user may be a preferred position for positioning the sensor interface device, e.g. in order to position the sensor interface device such that it can reach the plurality of sensor devices.

A server device for sensor data monitoring in a communication system comprising a communication apparatus, a radio unit and the server device is disclosed. The communication apparatus comprises a communication device and a sensor interface device. The server device comprises one or more processors, a memory, and an interface. The server device is configured to obtain user data from the communication apparatus. The server device is configured to determine event data based on the user data. The server device is configured to determine a transmission scheme for the event data. The server device is configured to transmit the event data according to the transmission scheme.

To obtain user data from the communication apparatus may comprise to obtain user data from the communication device and/or the sensor interface device.

The determine event data may comprise to determine an event indicative of the physical condition, the mental condition, and/or the equipment condition of the user based on the user data. The event data may comprise data related to an event such as one or more of that the user is tired, exhausted, ready, and/or dehydrated. The event data may further comprise data related to health critical conditions of the user, battery status of the equipment, armor/ammunition status of the weapon of the user, and/or overheating of the equipment. Further, the event data may further comprise data related to the weight load of the user, the temperature of the user, and/or the physical activity of the user.

The determine a transmission scheme may comprise to determine which users (e.g. which radio units) of the plurality of users communicating with the server device that the event data should be transmitted to, what event data that is to be transmitted to which users, and/or at which times the event data is to be transmitted, in turn leading to an optimum use of transmission bandwidth.

Different communication systems of different users (for example different generations of communication systems) may use different communication protocols. The transmission scheme may thereby comprise different transmitting protocols depending on the user and/or the communication system that is transmitted to.

It is to be understood that a description of a feature in relation to communication device(s) is also applicable to the corresponding method(s) and server device(s) and vice versa.

FIG. 1 shows an exemplary mission performing user 1 wearing an exemplary hearing protection system comprising a hearing protection device 2, a radio unit 6, 6A, 6B, and a communication apparatus according to the disclosure. The communication apparatus comprises a communication device 4 and a sensor interface device 17 configured to connect with a plurality of sensor devices S1, S2, S3, S4, including a first sensor device S1 and second device S2. In one or more exemplary communication apparatuses, communication systems, the hearing protection system may comprise a position module 38, that the user may wear e.g. as shown in the figure on his helmet. The communication device 4 and the sensor interface device 17 are here positioned on the torso of the user. The communication device and the sensor interface device may alternatively be worn on other body-parts of the user, such as the back, the arm, the leg, and/or the head (e.g. the helmet).

Figure 2:
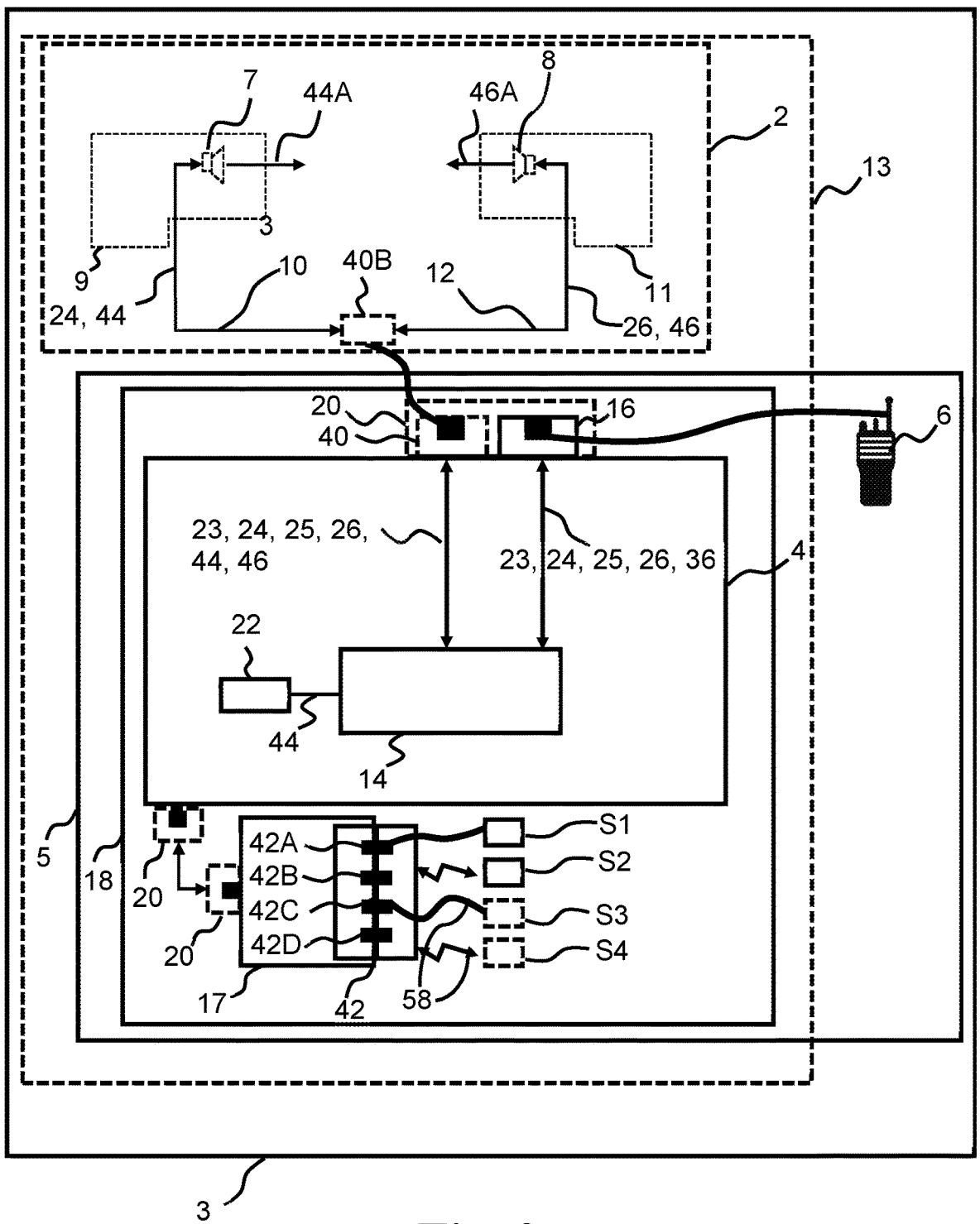
FIG. 2 is a block diagram of an exemplary communication apparatus and communication system according to the disclosure, FIG. 3 schematically illustrates an exemplary configuration of sensor devices.

FIG. 2 shows an exemplary hearing protection system 3 comprising a communication system 5 and a communication apparatus 18 according to the disclosure, a hearing protection device 2, and a radio unit 6.

The communication apparatus 18 comprises a communication device 4, a sensor interface device 17, a memory 22, and a processing unit 14. The sensor interface device comprises a sensor interface 42 configured to connect with a plurality of sensor devices S1, S2, S3, S4 including a first sensor device S1, a second sensor device S2, optional third sensor device S3, and optional fourth sensor device S4. The processing unit 14 is configured to obtain first sensor data 23 via a first sensor interface 42A of the sensor interface 42. The processing unit is configured to obtain second sensor data 25 via a second sensor interface 42B of the sensor interface 42. The processing unit is configured to determine user data 24 based on the first sensor data 23 and the second sensor data 25. Optionally, the processing unit 14 is configured to obtain third sensor data from third sensor device S3 via a third sensor interface of the sensor interface 42. Optionally, the processing unit 14 is configured to obtain fourth sensor data from fourth sensor device S4 via a fourth sensor interface of the sensor interface 42. The processing unit is optionally configured to determine user data 24 based on the third sensor data and/or the fourth sensor data.

In one or more exemplary communication apparatuses, communication systems, methods, and/or server devices, the communication apparatus 18 comprises a radio unit interface 16, and the processing unit 14 is optionally configured to transmit the user data 24 via the radio unit interface 16 to a radio unit 6 of the hearing protection apparatus 13. The connection between the communication device and the radio unit may be wired, i.e. via a cable. A cabled connection between the radio unit and the communication device provides flexibility in the positioning of the communication device and the radio unit while providing a robust and stable connection between the communication device and the radio unit which is essential during combat or other missions in harsh environments.

In one or more exemplary communication apparatuses, communication systems, methods, and/or server devices, the processing unit 14 is comprised in the communication device 4.

Alternatively, the processing unit may be comprised in the sensor interface device.

In one or more exemplary communication apparatuses, communication systems, methods, and/or server devices, the first sensor interface 42A comprises a first connector 58 for mechanical and electrical connection to the first sensor device S1.

In one or more exemplary communication apparatuses, communication systems, methods, and/or server devices, the second sensor interface 42B comprises a second connector 58 for mechanical and electrical connection to the second sensor device S2.

The sensor interface 42 device may comprise a connector 58 for each of a plurality of sensor devices S1, S2, S3, S4.

In one or more exemplary communication apparatuses, communication systems, methods, and/or server devices, the user data 24 comprises a first user parameter indicative of a physical state of the user.

In one or more exemplary communication apparatuses, communication systems, methods, and/or server devices, the first sensor data 23 is indicative of a first temperature measured by the first sensor device S1 positioned on a first part of the body of the user 1.

In one or more exemplary communication apparatuses, communication systems, methods, and/or server devices, the second sensor data 25 is indicative of a second temperature measured by the second sensor S2 being positioned at a second part of the body of the user 1.

In one or more exemplary communication apparatuses, communication systems, methods, and/or server devices, the first sensor data 23 is indicative of first chemical data measured by the first sensor device S1 being a first chemical sensor.

In one or more exemplary communication apparatuses, communication systems, methods, and/or server devices, the sensor interface device 17 comprises a wireless interface 42B and a wired interface 42A.

A communication system 5 for a hearing protection apparatus 13 for a mission performing user is disclosed. The communication system 5 comprises a communication apparatus 18 comprising a communication device 4 comprising a memory 22, a processing unit 14, a radio unit interface 16, and a sensor interface device 17. The communication system 5 comprises a plurality of sensor devices S1, S2, S3, S4 including a first sensor device S1 and a second sensor device S2, and a radio unit 6. The sensor interface device 17 comprises a sensor interface 42 configured to connect with the plurality of sensor devices. The processing unit 14 is configured to obtain first sensor data 23 via a first sensor interface 42A of the sensor interface 42.

Optionally, the processing unit 14 is configured to obtain second sensor data 25 via a second sensor interface 42B of the sensor interface 42.

The processing unit 14 is configured to determine user data 24 based on the first sensor data 23. Optionally, the processing unit 14 is configured to determine user data 24 based on the first sensor data 23 and the second sensor data 25. The processing unit 14 is optionally configured to transmit the user data 24 via the radio unit 6 to a server device.

In accordance with a determination of the user data 24, the processing unit 14 may be configured to determine a first audio output signal 44 based on first sensor data 23.

To output the first audio output signal 44 via the interface 20 may comprise to output the first audio output signal 44 to the hearing protection device 2, e.g. to a first receiver 7 of the hearing protection device 2. The first receiver 7 may be comprised in a first ear protector 9, such as a first earpiece or a first earmuff, of the hearing protection device 2, the first earpiece 9 comprising a first connection 10, such as a left connection. By outputting the first audio output signal the user may be informed about his/her condition and/or the condition of the equipment e.g. through audio outputs (sounds informing the user) via the hearing protection device.

The first receiver 7 may be a left receiver, such that the first audio output signal 44 may be outputted to the left receiver, e.g. at different amplitudes, depending on the user data 24 and/or the position of the first sensor device S1. The first audio output signal 44 may be outputted by the first receiver 7 as a first audio output 44A.

In accordance with a determination of the user data 24, the processing unit 14 may be configured to determine a second audio output signal 46 based on second sensor data 25.

To output the second audio output signal 46 via the interface 20 may comprise to output the second audio output signal 46 to the hearing protection device 2, e.g. to a second receiver 8 of the hearing protection device 2. The second receiver 8 may be comprised in a second ear protector 11, such as a second earpiece or a second earmuff, of the hearing protection device 2, the second earpiece 11 comprising a second connection 12, such as a right connection.

The second receiver 8 may be a right receiver, such that the second audio output signal 46 may be outputted to the right receiver, e.g. at different amplitudes, depending on the user data 24 and/or the position of the second sensor device S2. The second audio output signal 46 may be outputted by the second receiver 8 as a second audio output 46A.

Figure 3:
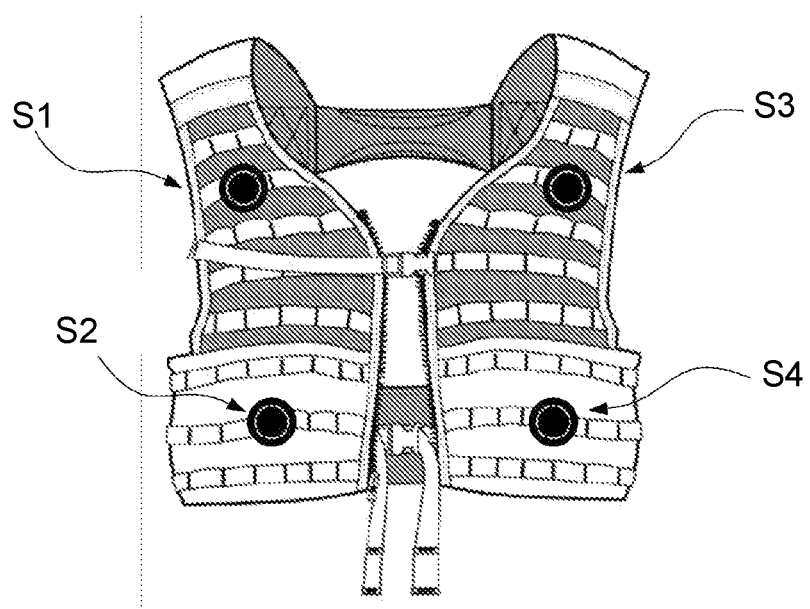

FIG. 3 is a schematic representation of an exemplary equipment for a mission performing user, the equipment comprising a plurality of sensor devices S1, S2, S3, S4. The equipment is in FIG. 3 a safety vest, where fours sensor devices have been positioned at four different positions of the vest. The sensor devices S1, S2, S3, S4 are therefore configured to measure user parameters at different parts of the body of the user.

Figure 4:
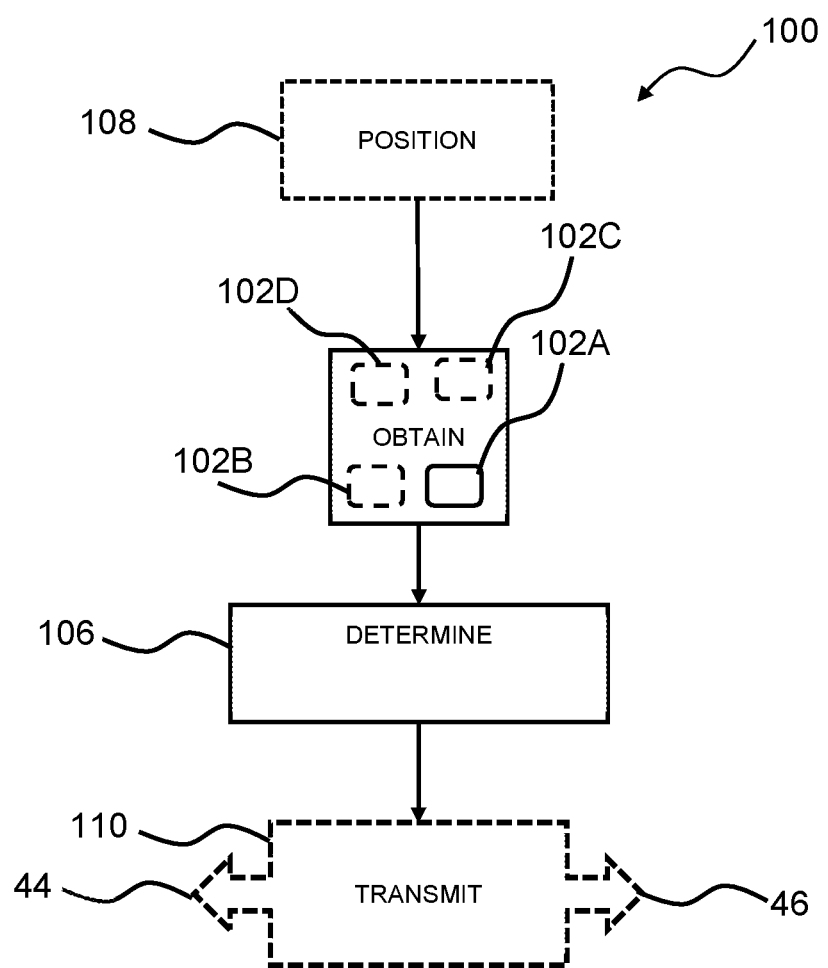
FIG. 4 is a flow diagram of an exemplary method according to the disclosure.

FIG. 4 is a flow diagram of an exemplary method 100 of operating a communication apparatus for a hearing protection apparatus for a mission performing user.

The communication apparatus comprises a communication device and a sensor interface device. The sensor interface device comprises a sensor interface configured to connect with a plurality of sensor devices including a first sensor device and a second sensor device. The communication apparatus comprises a memory and a processing unit.

The method 100 comprises obtaining 102A first sensor data via a first sensor interface of the sensor interface.

The method comprises obtaining 102B second sensor data via a second sensor interface of the sensor interface.

In one or more exemplary communication apparatuses, communication systems, methods, and/or server devices, the method comprises obtaining 102C third sensor data via a third second sensor interface of the sensor interface.

In one or more exemplary communication apparatuses, communication systems, methods, and/or server devices, the method comprises obtaining 102D fourth sensor data via a fourth second sensor interface of the sensor interface.

The method comprises determining 106 user data based on the first sensor data and the second sensor data.

In one or more exemplary communication apparatuses, communication systems, methods, and/or server devices, the communication apparatus comprises a radio unit interface, the method comprises transmitting 110 the user data via the radio unit interface to a radio unit of the hearing protection apparatus.

In one or more exemplary communication apparatuses, communication systems, methods, and/or server devices, the method comprises positioning 108 the sensor interface device on a torso of the user.

Figure 5:
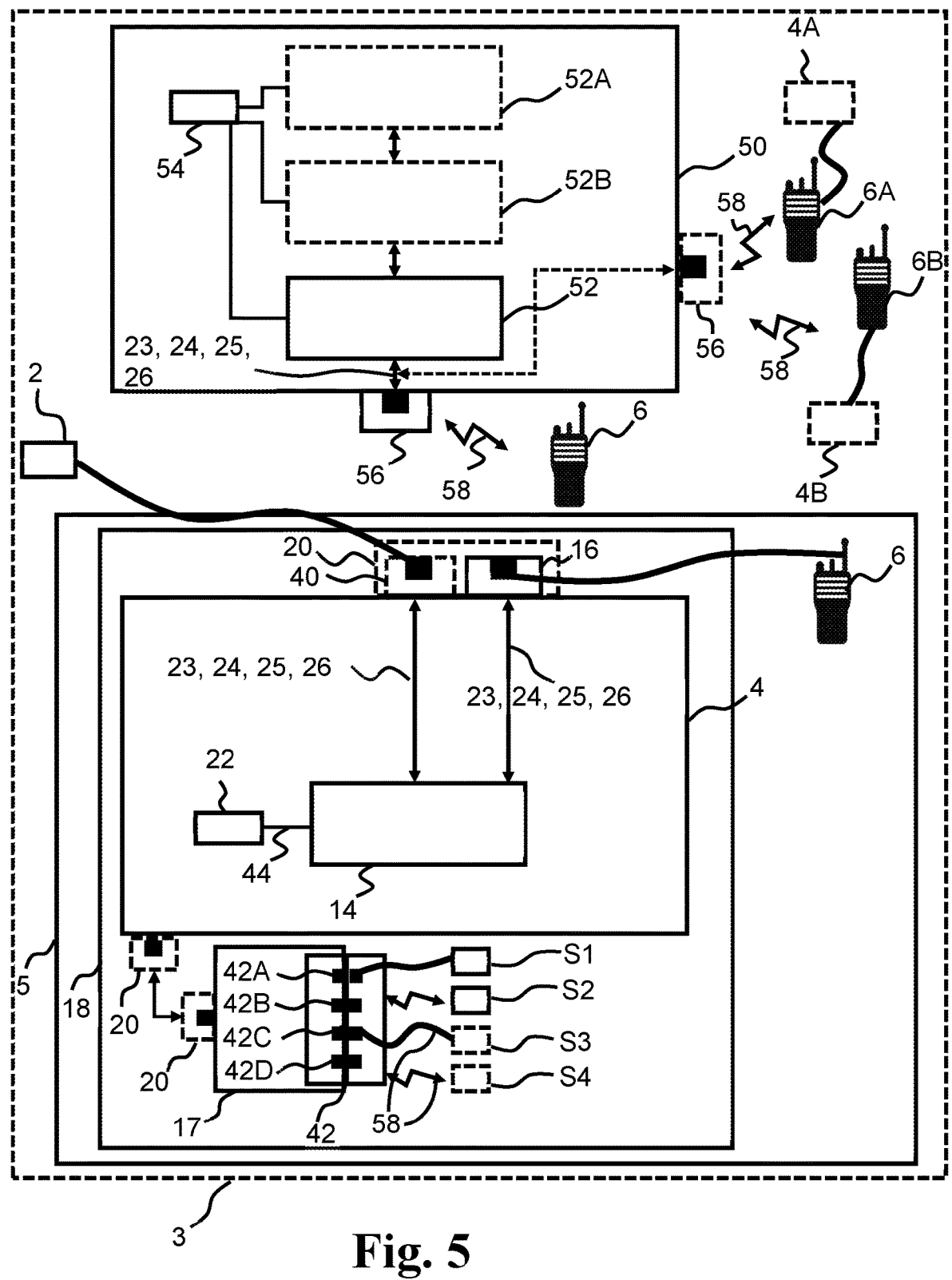
FIG. 5 is a block diagram of an exemplary server device according to the disclosure.

FIG. 5 shows an exemplary server device 50 for sensor data monitoring in a communication system 5 comprising a communication apparatus 18, the server device 50, and a radio unit 6. The communication apparatus 18 comprises a communication device 4 and a sensor interface device 17. The sensor interface device 17 may comprise a sensor interface 42 configured to connect with a plurality of sensor devices S1, S2, S3, S4 including a first sensor device S1 and a second sensor device S2 through connections 58.

The server device 50 comprises one or more processors 52, 52A, 52B, a memory 54, and an interface 56. The server device 50 is configured to obtain user data 24 from the communication apparatus 18. The server device 50 is configured to determine event data 26 based on the user data 24. The server device 50 is configured to determine a transmission scheme for the event data 26. The server device 50 is configured to transmit the event data 26 according to the transmission scheme.

In one or more exemplary server devices, the server device 50 is configured to transmit the event data 26 via the interface 56 through a connection 58.

In one or more exemplary server devices, the server device 50 is configured to transmit the event data 26 via the interface 56 to a second radio unit 6A configured to communicate with a second communication device 4A, and a third radio unit 6B configured to communicate with a third communication device 4B.

For example, in a multi-user system where a plurality of mission performing users each having a communication device communicating with the server device 50, the server device 50 may be configured to obtain user data 24 from one or more of the plurality of communication devices 4, 4A, 4B. To determine event data 26 may therefore comprise to determine event data 26 for each or some of the plurality of users. The server device 50 may be configured to transmit the event data 26 via the interface 56.

Also disclosed are communication apparatus, communication systems, methods and server devices according to any of the following items.

Item 1. A communication apparatus for a hearing protection apparatus for a mission performing user, the communication apparatus comprising:
  a communication device;
  a sensor interface device comprising a sensor interface configured to connect with a plurality of sensor devices including a first sensor device and a second sensor device;
  a memory; and
  a processing unit;
  wherein the processing unit is configured to:
    obtain first sensor data via a first sensor interface of the sensor interface;
    obtain second sensor data via a second sensor interface of the sensor interface; and
    determine user data based on the first sensor data and the second sensor data.

Item 2. Communication apparatus according to Item 1, wherein the communication apparatus comprises a radio unit interface, and wherein the processing unit is configured to transmit the user data via the radio unit interface to a radio unit of the hearing protection apparatus.

Item 3. Communication apparatus according to any one of Items 1-2, wherein the processing unit is comprised in the communication device.

Item 4. Communication apparatus according to any one of Items 1-3, wherein the first sensor interface comprises a first connector for mechanical and electrical connection to the first sensor device.

Item 5. Communication apparatus according to any one of Items 1-4, wherein the second sensor interface comprises a second connector for mechanical and electrical connection to the second sensor device.

Item 6. Communication apparatus according to any one of Items 1-5, wherein the user data comprises a first user parameter indicative of a physical state of the user.

Item 7. Communication apparatus according to any one of Items 1-6, wherein the first sensor data is indicative of a first temperature measured by the first sensor device positioned on a first part of the body of the user.

Item 8. Communication apparatus according to any one of Items 1-7, wherein the second sensor data is indicative of a second temperature measured by the second sensor being positioned at a second part of the body of the user.

Item 9. Communication apparatus according to any one of Items 1-8, wherein the first sensor data is indicative of first chemical data measured by the first sensor device being a first chemical sensor.

Item 10. Communication apparatus according to any one of Items 1-9, wherein the sensor interface device comprises a wireless interface and a wired interface.

Item 11. A communication system for a hearing protection apparatus for a mission performing user, the communication system comprising:
  a communication apparatus comprising a communication device comprising a memory, a processing unit, a radio unit interface, and a sensor interface device;
  a plurality of sensor devices including a first sensor device and a second sensor device; and
  a radio unit;
  wherein the sensor interface device comprises a sensor interface configured to connect with the plurality of sensor devices;
  wherein the processing unit is configured to:
    obtain first sensor data via a first sensor interface of the sensor interface;
    obtain second sensor data via a second sensor interface of the sensor interface;
    determine user data based on the first sensor data and the second sensor data; and
    transmit the user data via the radio unit to a server device.

Item 12. A method of operating a communication apparatus for a hearing protection apparatus for a mission performing user, the communication apparatus comprising a communication device and a sensor interface device, the sensor interface device comprising a sensor interface configured to connect with a plurality of sensor devices including a first sensor device and a second sensor device, the communication apparatus comprising a memory, and a processing unit,
wherein the method comprises:
  obtaining first sensor data via a first sensor interface of the sensor interface;
  obtaining second sensor data via a second sensor interface of the sensor interface; and
  determining user data based on the first sensor data and the second sensor data.

Item 13. Method according to Item 12, comprising:
  positioning the sensor interface device on a torso of the user.

Item 14. A server device for sensor data monitoring in a communication system comprising a communication apparatus, a radio unit and the server device, wherein the communication apparatus comprises a communication device and a sensor interface device, wherein the server device comprises:
  one or more processors;
  a memory; and
  an interface,
wherein the server device is configured to:
  obtain user data from the communication apparatus;
  determine event data based on the user data;
  determine a transmission scheme for the event data; and
  transmit the event data according to the transmission scheme.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa. It may be appreciated that FIGS. 1-5 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example communication devices, methods, and/or server devices which may be comprised in, or a part of, or are further modules or operations which may be taken in addition to the modules or operations of the solid line example communication devices, methods, and/or server devices. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary communication devices, methods, and/or server devices may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES 1 mission performing user
2 hearing protection device
3 hearing protection system
4, 4A, 4B communication device
5 communication system
6, 6A, 6B radio unit
7 first receiver
8 second receiver
9 first ear protector, first earpiece, first earmuff
10 first connection
11 second ear protector, second earpiece, second earmuff
12 second connection
13 hearing protection apparatus
14 processor
16 radio unit interface
17 sensor interface device
18 communication apparatus
20 interface
22 memory
23 first sensor data
24 user data
25 second sensor data
26 event data 40, 40B hearing protection device interface
42 sensor interface
42A first sensor interface
42B second sensor interface
42C third sensor interface
42D fourth sensor interface
44 first audio output signal
44A first audio output
46 second audio output signal
46A second audio output
50 server device
52, 52A, 52B processors
54 memory
56 interface
58 connection
S1 first sensor device
S2 second sensor device
S3 third sensor device
S4 fourth sensor device
100 method of operating a communication apparatus for a hearing protection apparatus for a mission performing user
102A obtaining first sensor data via a first sensor interface of the sensor interface
102B obtaining second sensor data via a second sensor interface of the sensor interface
102C obtaining third sensor data via a third second sensor interface of the sensor interface
102D obtaining fourth sensor data via a fourth second sensor interface of the sensor interface
106 determining user data based on the first sensor data and the second sensor data
108 positioning the sensor interface device on a torso of the user
110 transmitting the user data via the radio unit interface to a radio unit of the hearing protection apparatus
S1 first sensor device
S2 second sensor device
S3 third sensor device
S4 fourth sensor device

The invention claimed is:

1. A communication apparatus for a hearing protection apparatus for a mission performing user, the communication apparatus comprising:
a sensor interface device comprising a first sensor interface and a second sensor interface configured to respectively connect with a first sensor device and a second sensor device; and
a processing unit;
wherein the processing unit is configured to:
obtain first sensor data via the first sensor interface, wherein the first sensor interface comprises a first connector for mechanical and electrical connection to the first sensor device, and wherein the first sensor data comprises information related to a physiological condition and/or mental condition of the mission performing user;
obtain second sensor data via the second sensor interface; and
determine user data based on the first sensor data and the second sensor data, wherein the user data is different from the first sensor data.

2. The communication apparatus according to claim 1, further comprising a radio unit interface, wherein the processing unit is configured to provide the user data for output by the radio unit interface to a radio unit.

3. The communication apparatus according to claim 2, wherein the radio unit is a part of the hearing protection apparatus, and the radio unit interface is configured to output the user data to the radio unit of the hearing protection apparatus.

4. The communication apparatus according to claim 1, wherein the second sensor interface comprises a second connector for mechanical and electrical connection to the second sensor device.

5. The communication apparatus according to claim 1, wherein the user data comprises a first user parameter indicative of a physical state of the mission performing user.

6. The communication apparatus according to claim 1, wherein the first sensor data is indicative of a first temperature measured by the first sensor device positioned on a first part of a body of the mission performing user.

7. The communication apparatus according to claim 6, wherein the second sensor data is indicative of a second temperature measured by the second sensor device being positioned at a second part of the body of the mission performing user.

8. The communication apparatus according to claim 1, wherein the first sensor data is indicative of first chemical data measured by the first sensor device, and wherein the first sensor device is a chemical sensor.

9. The communication apparatus according to claim 1, wherein the sensor interface device comprises a wireless interface and a wired interface.

10. The communication apparatus according to claim 1, further comprising a communication device, wherein the processing unit is a part of the communication device.

11. The communication apparatus according to claim 10, wherein the communication device and the sensor interface device are configured to releasably couple with respect to each other.

12. The communication apparatus according to claim 1, wherein the first sensor interface is configured to releasably connect with the first sensor device.

13. The communication apparatus according to claim 12, wherein the first connector of the first sensor interface is configured to releasably connect with a wire or a cable for the first sensor device.

14. The communication apparatus according to claim 1, further comprising a radio unit interface configured to connect with a cable for a radio unit.

15. The communication apparatus according to claim 1, further comprising a memory configured to store the first sensor data.

16. The communication apparatus according to claim 1, wherein the first sensor device and the second sensor device are configured for placement at a torso and above a waist of the mission performing user.

17. The communication apparatus according to claim 1, wherein the first sensor data is provisioned by the first sensor device, and comprises physiological data.

18. The communication apparatus according to claim 1, wherein the second sensor data indicates a condition of an equipment.

19. The communication apparatus according to claim 1, wherein the user data indicates a state of the mission performing user, and is different from the first sensor data and the second sensor data.

20. The communication apparatus according to claim 1, wherein the user data indicates a fatigue level of the mission performing user.

21. A communication system for a hearing protection apparatus for a mission performing user, the communication system comprising:
- a processing unit;
- a radio unit interface;
- a sensor interface device;
- a plurality of sensor devices including a first sensor device and a second sensor device; and
- a radio unit;
- wherein the sensor interface device of the communication system comprises a first sensor interface and a second sensor interface configured to respectively connect with the plurality of sensor devices;
- wherein the processing unit is configured to:
  - obtain first sensor data via the first sensor interface of the interface, wherein the first sensor data comprises information related to a physiological condition and/or mental condition of the mission performing user;
  - obtain second sensor data via the second sensor interface of the interface;
  - determine user data based on the first sensor data and the second sensor data, wherein the user data is different from the first sensor data; and
  - provide the user data to the radio unit for transmission to a server device.

22. The communication system according to claim 21, wherein the communication system comprises a communication device, and wherein the processing unit is a part of the communication device.

23. The communication system according to claim 22, wherein the communication device and the sensor interface device are configured to releasably couple with respect to each other.

24. The communication system according to claim 21, wherein the first sensor interface is configured to releasably connect with the first sensor device.

25. The communication system according to claim 24, wherein the first sensor interface is configured to releasably connect with a wire or a cable for the first sensor device.

26. The communication system according to claim 21, wherein the radio unit interface is configured to connect with a cable for the radio unit.

27. The communication system according to claim 21, wherein the first sensor device and the second sensor device are configured for placement at a torso and above a waist of the mission performing user.

28. The communication system according to claim 21, wherein the first sensor data is provisioned by the first sensor device, and comprises physiological data.

29. The communication apparatus according to claim 21, wherein the second sensor data indicates a condition of an equipment.

30. The communication apparatus according to claim 21, wherein the user data indicates a state of the mission performing user, and is different from the first sensor data and the second sensor data.

31. The communication apparatus according to claim 21, wherein the user data indicates a fatigue level of the mission performing user.

* * * * *